US012332673B2

(12) United States Patent
Subramanian et al.

(10) Patent No.: US 12,332,673 B2
(45) Date of Patent: Jun. 17, 2025

(54) VOLTAGE REGULATOR TO PREVENT VOLTAGE DROP IN REGULATED VOLTAGE FOR DOUBLE DATA READ PHYSICAL INTERFACE

(71) Applicant: Faraday Technology Corp., Hsin-Chu (TW)

(72) Inventors: Sivaramakrishnan Subramanian, Karnataka (IN); Hussainvali Shaik, Karnataka (IN); Eswar Reddi, Karnataka (IN)

(73) Assignee: Faraday Technology Corp., Hsin-Chu (TW)

( * ) Notice: Subject to any disclaimer, the term of this patent is extended or adjusted under 35 U.S.C. 154(b) by 224 days.

(21) Appl. No.: 18/079,837

(22) Filed: Dec. 12, 2022

(65) Prior Publication Data

US 2024/0192714 A1 Jun. 13, 2024

(51) Int. Cl.
*G05F 1/565* (2006.01)
*G05F 1/575* (2006.01)

(52) U.S. Cl.
CPC .............. *G05F 1/565* (2013.01); *G05F 1/575* (2013.01)

(58) Field of Classification Search
CPC . G05F 1/46; G05F 1/461; G05F 1/462; G05F 1/465; G05F 1/466; G05F 1/467; G05F 1/56; G05F 1/561; G05F 1/562; G05F 1/563; G05F 1/565; G05F 1/569; G05F 1/573; G05F 1/575; G05F 1/59; G05F 1/595; G05F 3/24–267; G11C 5/147; G11C 7/22–227; G11C 11/401; G11C 11/408; G11C 11/4063; G11C 11/407; G11C 11/4074; G11C 11/4076
USPC ........ 323/223–226, 266–275, 280–285, 304, 323/311–317, 351; 327/538–543; 365/233.1–233.5
See application file for complete search history.

(56) References Cited

U.S. PATENT DOCUMENTS 6,922,098 B2 * 7/2005 Choi .............. H03K 19/018585 327/543
8,981,750 B1 3/2015 Meher
11,874,682 B1 * 1/2024 Tollot ...................... G05F 1/575
2004/0240309 A1 12/2004 Piorun
2010/0026251 A1 * 2/2010 Lam ...................... H02M 3/158 323/273

(Continued)

FOREIGN PATENT DOCUMENTS

TW 202121423 A 6/2021

*Primary Examiner* — Thienvu V Tran
*Assistant Examiner* — Carlos O Rivera-Perez
(74) *Attorney, Agent, or Firm* — Winston Hsu

(57) ABSTRACT

A voltage regulator provides a regulated voltage to a double data rate (DDR) Physical Interface (PHY) including a plurality of delay elements. The voltage regulator includes: an amplifier, for receiving a voltage at a first input terminal and generating an output voltage; a first MOSFET coupled to a supply voltage and a second input terminal of the amplifier; a second MOSFET coupled in parallel with the first MOSFET for generating a first current in response to a first enable signal; a load, coupled to the first MOSFET and the second MOSFET, for generating the regulated voltage; and a load capacitor, coupled in parallel with the load. The first enable signal is generated by inputting a gate enable signal for a delay element of the plurality of delay elements into a delay circuit corresponding to the delay element.

5 Claims, 6 Drawing Sheets

(56) References Cited

U.S. PATENT DOCUMENTS

2022/0390971 A1 12/2022 Jung

* cited by examiner

VOLTAGE REGULATOR TO PREVENT VOLTAGE DROP IN REGULATED VOLTAGE FOR DOUBLE DATA READ PHYSICAL INTERFACE

BACKGROUND OF THE INVENTION

1. Field of the Invention

The present invention is directed to voltage regulation for a double data read physical interface, and more particularly, to a voltage regulator that can prevent a voltage drop occurring in the regulated voltage provided to a double data read physical interface.

2. Description of the Prior Art

Double Data Rate (DDR) circuits transfer data on both the rising and falling edges of a clock signal. In this way, compared to a single data rate circuit, DDR circuits can provide twice the bandwidth without requiring an increased clock frequency.

Refer to FIG. 1, which illustrates various read paths in a conventional DDR Physical Interface (PHY) circuit 100. The DDR PHY circuit 100 comprises a DQS path, and data read paths DQ0, DQ1, . . . , DON. The DQS path comprises a receiver 103 which receives differential clock signals DQSP, DQSN, and outputs a clock signal DQS to an AND gate 105. When a Gate_enable signal is input to the AND gate 105, the clock signal DQS is output to a Digitally Controlled Delay Line (DCDL) circuit 107, which in turn outputs the delayed CLK to a Duty Cycle Corrector (DCC) circuit 109 (to make sure the Duty Cycle of the DCC output is 50%, as the circuit 100 is a Double Data Rate circuit). The duty cycle corrected CLK is sent to a buffer 111, and the buffered CLK can then be supplied to all the data read paths DQ0, DQ1, . . . , DON. For simplicity, only the structure of data read paths DQ0 and DQ1 are shown, but one skilled in the art will understand that the structure of the remaining data read paths are largely the same as DQ0 and DQ1.

As shown in FIG. 1, the data read path DQ0 comprises a Decision Feedback Equalization (DFE) receiver (Rx) 123, which receives a signal DQ carrying the sample data, and is biased by a reference voltage VREF. The buffered CLK output by the buffer 111 is input to a bit-skew circuit 125, which is a delay element that can delay the signal by a desired timing margin as well as correcting inherent skew due to the different data lines. The bit-skew circuit 125 outputs the corrected CLK signal to the receiver 123, for sampling the data signal DQ at the appropriate timing. The data read path DQ1 operates in a similar fashion, and therefore will not be described herein.

All components in the above-described DDR PHY 100 require a regulated power supply, wherein the power supply needs to comprise a voltage that falls within a certain range. This voltage is typically generated by a voltage regulator, which (in its simplest form) consists of an amplifier having an output coupled to a MOSFET that is coupled between a supply voltage and the load. The following description takes an NMOS as an example of the MOSFET but a PMOS may also be used. A negative feedback loop routes the sensed voltage (i.e. signal generated at the drain of the MOSFET) back to the inverting input of the amplifier, while the non-inverting input receives a reference voltage such as a bandgap voltage. A capacitor may be coupled in parallel to the load to stabilize the supply voltage.

In order to supply a sufficiently large regulated voltage to the DDR PHY, the capacitive load must also be large. The amplifier will constantly adjust its output to force the sensed voltage to be equal to the bandgap voltage. This means that, even when there are changes in the load current, the regulated voltage will remain at a fixed value. Sudden large changes in the load current, however, will cause a change in the regulated voltage VREG. A read request of the DDR PHY 100, particularly when the read request is across more than one data read path, will result in this voltage drop, as the amplifier requires a certain amount of time to correct for the change in load current, known as the amplifier transient response.

Further, although the bit-skew circuits in the data read paths operate to reduce any skew in the propagated clock signals, there may still be a mismatch between the clock signal and the data signal (i.e. the read data). In such a case, a read burst will result in an even greater drop in the regulated voltage, which reduces the read margin and may make the data inaccurate.

SUMMARY OF THE INVENTION

The invention aims to solve the problems of the prior art by providing a voltage regulator which utilizes staggered current sources which generate currents according to enable signals that are generated according to delay components in a DDR PHY circuit. The invention also provides an auxiliary voltage regulator which generates a bias voltage used to bias the staggered current sources, wherein the bias current is generated according to a reference current which tracks with process, voltage and temperature (PVT) variations of a delay element of the DDR PHY, and tracks with frequency variations of a clock signal input to the DDR PHY.

The claimed voltage regulator provides a regulated voltage to a double data rate (DDR) Physical Interface (PHY), the DDR PHY including a clock path and a plurality of data read paths, the clock path comprising a plurality of delay elements for receiving a clock signal and generating a delayed clock signal, respectively, and each data read path of the plurality of data read paths comprising a bitskew circuit. The voltage regulator comprises: an amplifier, for receiving a bandgap voltage at a first input terminal and generating an output voltage; a first MOSFET having a first terminal coupled to the output voltage, a second terminal coupled to a supply voltage, and a third terminal coupled to a second input terminal of the amplifier; at least a second MOSFET for generating a first current in response to a first enable signal, the second MOSFET coupled in parallel with the first MOSFET and having a second terminal coupled to the supply voltage, a first terminal coupled to a bias voltage, and a first switch coupled between the second terminal of the second MOSFET and the power supply, wherein the first switch is closed in response to the first enable signal; a load, coupled to the third terminal of the first MOSFET and a third terminal of the second MOSFET, for generating the regulated voltage; and a load capacitor, coupled in parallel with the load, and coupled to ground. The first enable signal is generated by inputting a gate enable signal for a first delay element of the plurality of delay elements into a first delay circuit, the first delay circuit corresponding to the first delay element.

As the voltage generated by the auxiliary voltage regulator can be tracked for PVT and frequency variations, the size of the staggered current sources can also track with PVT and frequency variations. This leads to an improved timing margin between a clock signal and a data signal of the DDR PHY.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
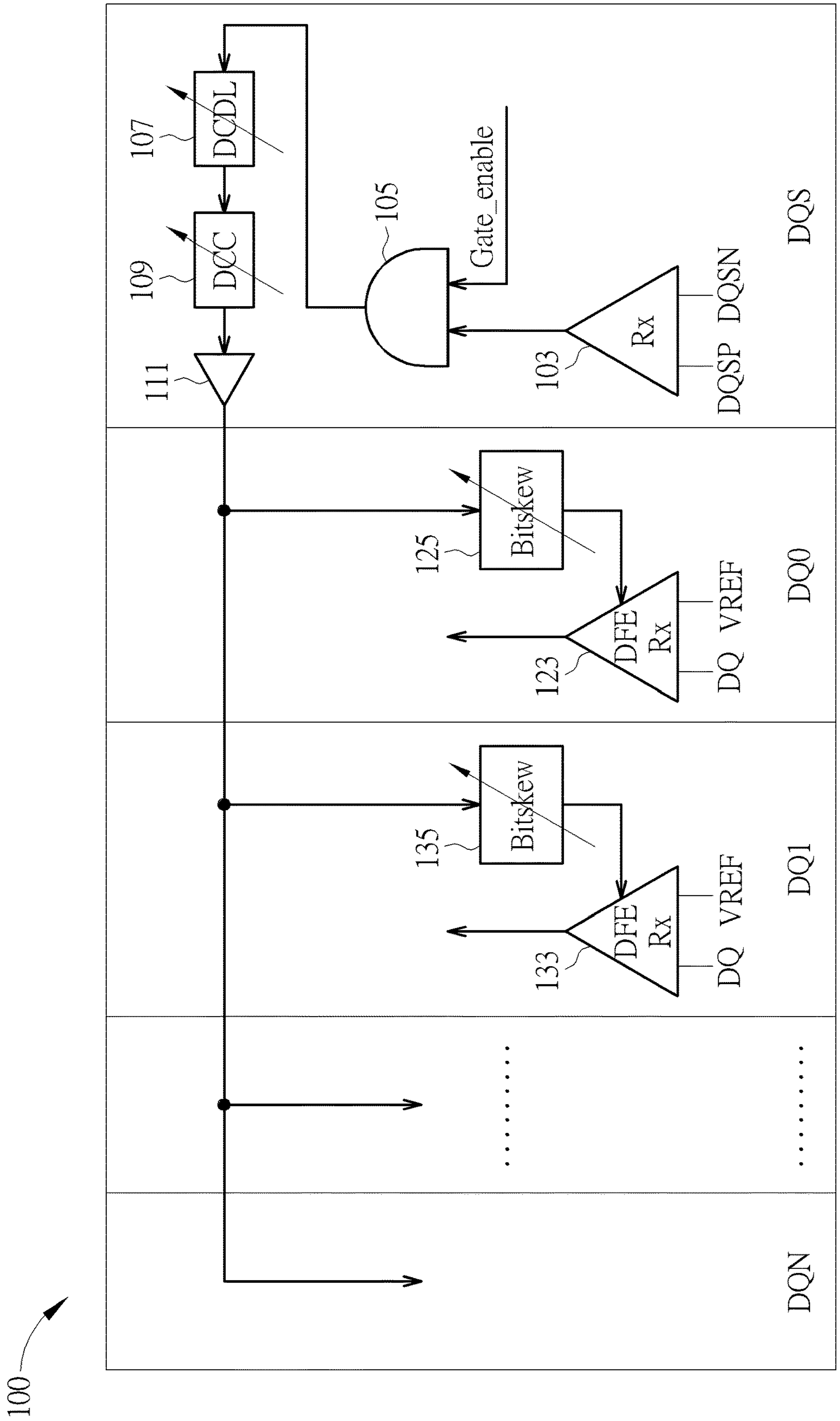
FIG. 1 RELATED ART
FIG. 1 is a diagram of a clock path and data read paths in a Double Data Rate circuit.
Figure 2A:
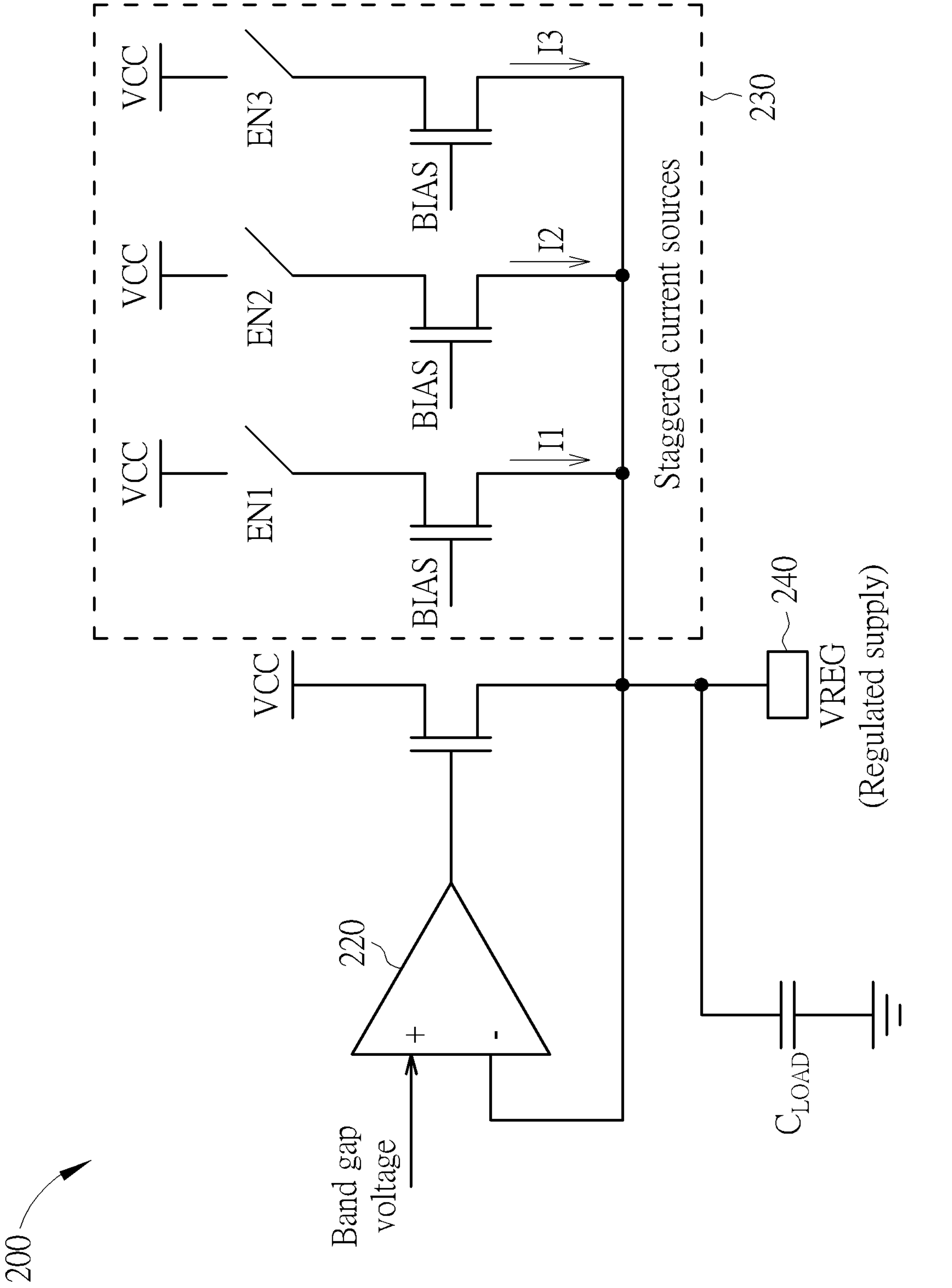
FIG. 2A is a diagram of a voltage regulator according to a first embodiment of the present invention.

Refer to FIG. 2A, which is a diagram of a main voltage regulator 200 according to a first embodiment of the invention. As shown in the diagram, the regulator 200 comprises an amplifier 220, which receives a bandgap voltage at the non-inverting input and a sensed voltage being the output of a negative feedback loop at the inverting input. The amplifier 220 compares the two inputs and adjusts its output to force the voltages at the inverting input and non-inverting input to be equal to each other. This output voltage is input to the gate of a MOSFET, which has a drain coupled to a supply voltage VCC and a source coupled to the load 240, which generates the regulated voltage supply VREG, which is then supplied to circuit elements in a DDR PHY such as the DDR PHY 100 illustrated in FIG. 1. To stabilize the regulated supply voltage, a load capacitor $C_{LOAD}$ is coupled in parallel with the load 240.

As well as the main MOSFET, the voltage regulator 200 further comprises a plurality of staggered current sources 230. These staggered current sources 230 are generated by a plurality of MOSFETs coupled in parallel between the voltage supply VCC and the inverting input of the amplifier 220. Each MOSFET is biased by a bias voltage at its gate, and has a drain coupled to a switch which is turned on by an enable signal EN, such that staggered current sources I1, I2 and I3 are generated by, respectively, enable signals EN1, EN2 and EN3.

Refer again to FIG. 1; in particular, the DQS CLK path. When there is a read request, the CLK will be propagated through the DOS path from the receiver Rx 103 to the AND gate 105, where it will be delayed until a Gate_enable signal is received. The delayed CLK signal will then be propagated through two more delay elements—namely, the DCDL circuit 107 and the DCC circuit 109. Each delay circuit requires a regulated power supply. The staggered current sources 230 are enabled according to timing of these three delay components in the CLK path DQS receiving the clock signal CLK, such that the required regulated voltage is supplied at the time it is required by each respective delay element. This serves to minimize any voltage drop incurred due to a read request of the DDR PHY 100.

Figure 2B:
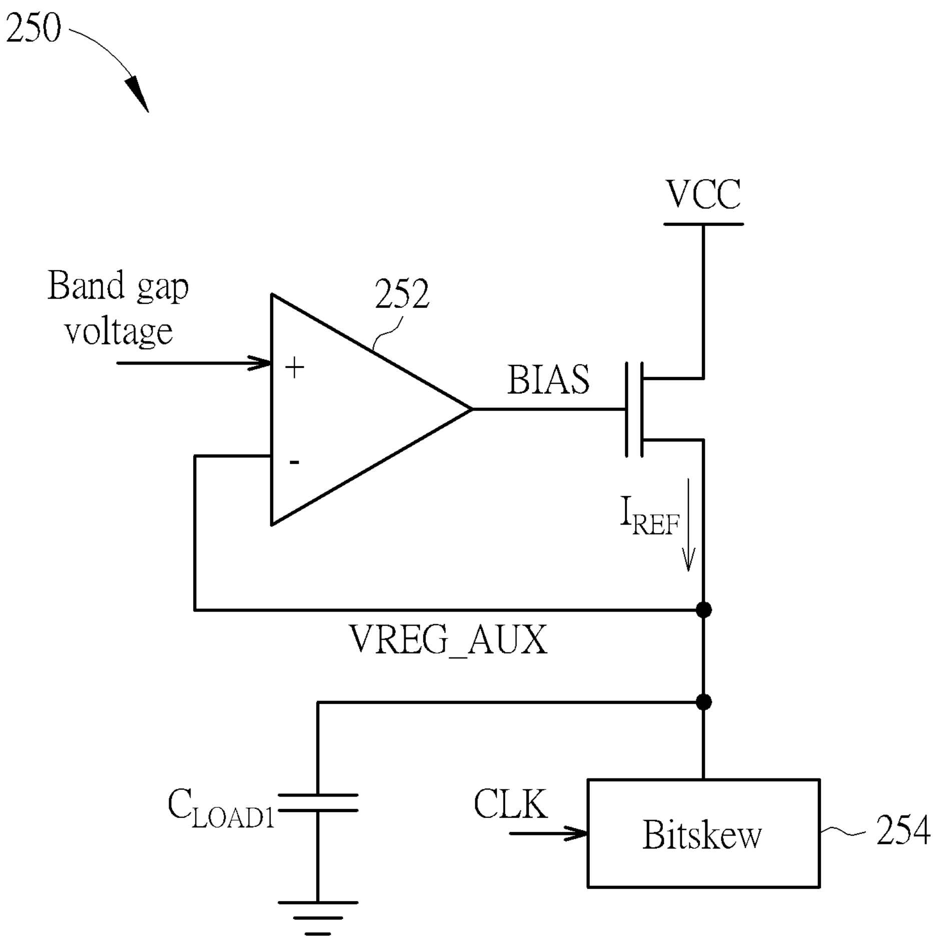
FIG. 2B is a diagram of an auxiliary regulator used in combination with the main regulator illustrated in FIG. 2A.

As shown in FIG. 2A, each staggered current source comprises a MOSFET which receives a biased voltage BIAS at its gate. This bias voltage is generated by an auxiliary regulator, which can generate a reference current which can be tracked for PVT and frequency variations. Refer to FIG. 2B, which is a diagram of an auxiliary regulator 250 according to the first embodiment of the invention. As shown in the diagram, the auxiliary regulator 250 comprises an amplifier 252, which receives a bandgap voltage at the non-inverting input and an auxiliary regulated voltage VREG AUX generated by the negative feedback loop at the inverting input. The bandgap voltage is the same bandgap voltage as that supplied to the amplifier 220 of the main regulator 200. The load of the amplifier 252 is a bitskew circuit 254 which receives a clock signal CLK, and a load capacitor $C_{LOAD1}$ is coupled in parallel with the bitskew circuit 254. The load capacitor $C_{LOAD1}$ can be a different load from that of the main regulator 200, depending on differences in their respective current requirements.

As detailed above, the staggered current sources 230 of the main regulator 200 are designed to follow the timing of delay elements in the DDR PHY 100, and comprise MOSFETs which are biased by a bias voltage BIAS. This bias voltage is generated by the auxiliary regulator 250 and according to a reference current IREF required by the bitskew circuit 254. It should be noted that the bitskew circuit 254 is designed to be the same as the bitskew circuits 125, 135 in the DQ0 and DQ1 read paths, respectively, and the bitskew circuit 254 also receives the same clock signal CLK as that supplied to the DQS path. Due to the frequency of the clock signal CLK being known, as it is the same frequency as the read clock of the DDR PHY 100, the generated current IREF can be tracked for a specific frequency. In addition, the negative feedback loop of the amplifier 252 means that the generated voltage VREG AUX can be tracked, as the same bandgap voltage used to generate VREG AUX is used to generate the regulated voltage supply of the main regulator 200 VREG. Process variations can also be tracked, as the bitskew circuits in the DDR PHY 100 are the same circuit as the bitskew circuit 254 of the auxiliary regulator 250. Moreover, the bitskew circuits in the DDR PHY 100 are situated close to each other, meaning that there will not be significant temperature variations. In this way, the bias supplied to the MOSFETs of the staggered current sources 230 will scale with frequency and PVT variations in the DDR PHY 100, ensuring that the regulated voltage VREG generated by the voltage regulator 200 can more clearly match the real-world voltage requirements of the DDR PHY 100.

Figure 3A:
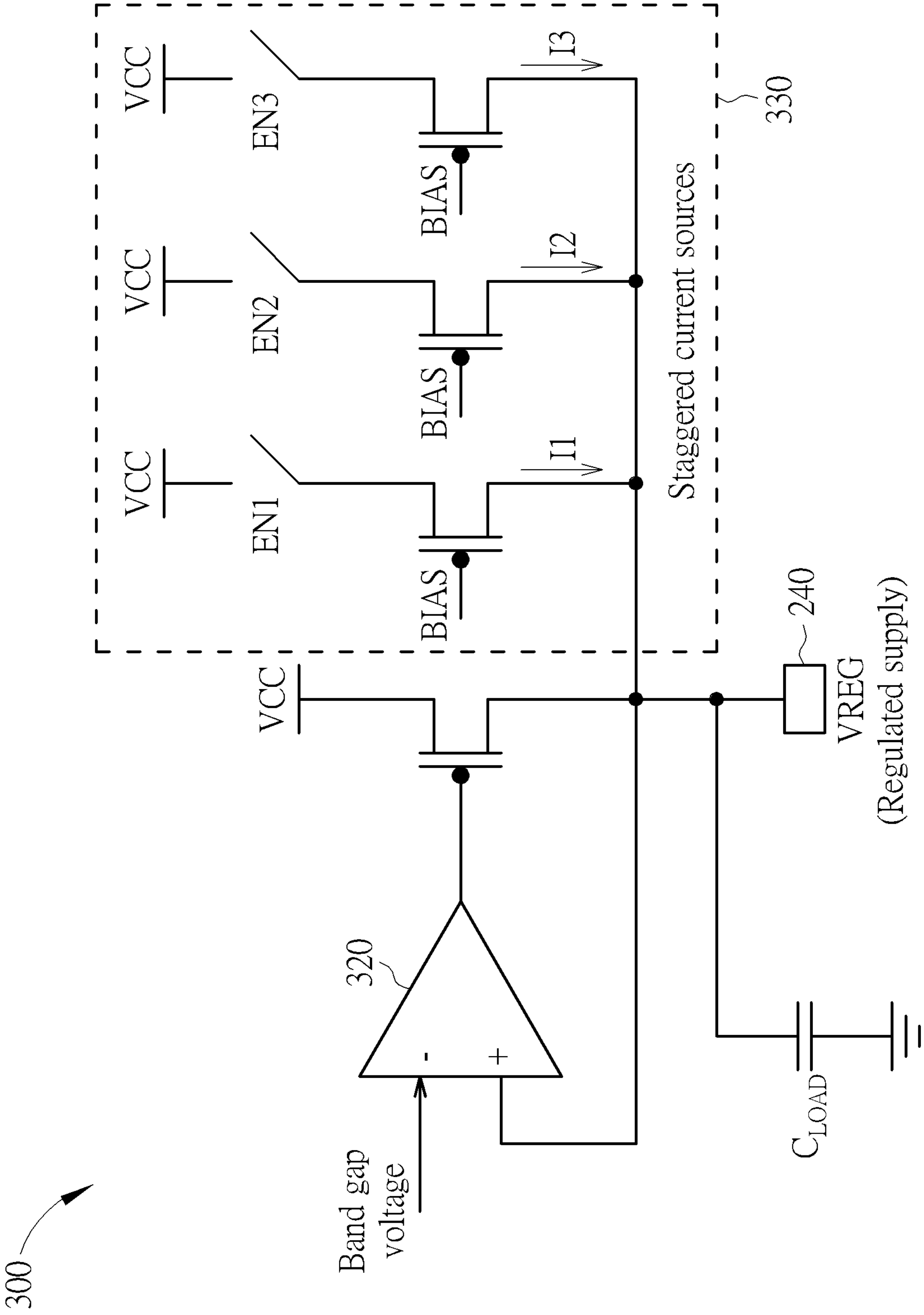
FIG. 3A is a diagram of a voltage regulator according to a second embodiment of the present invention.
Figure 3B:
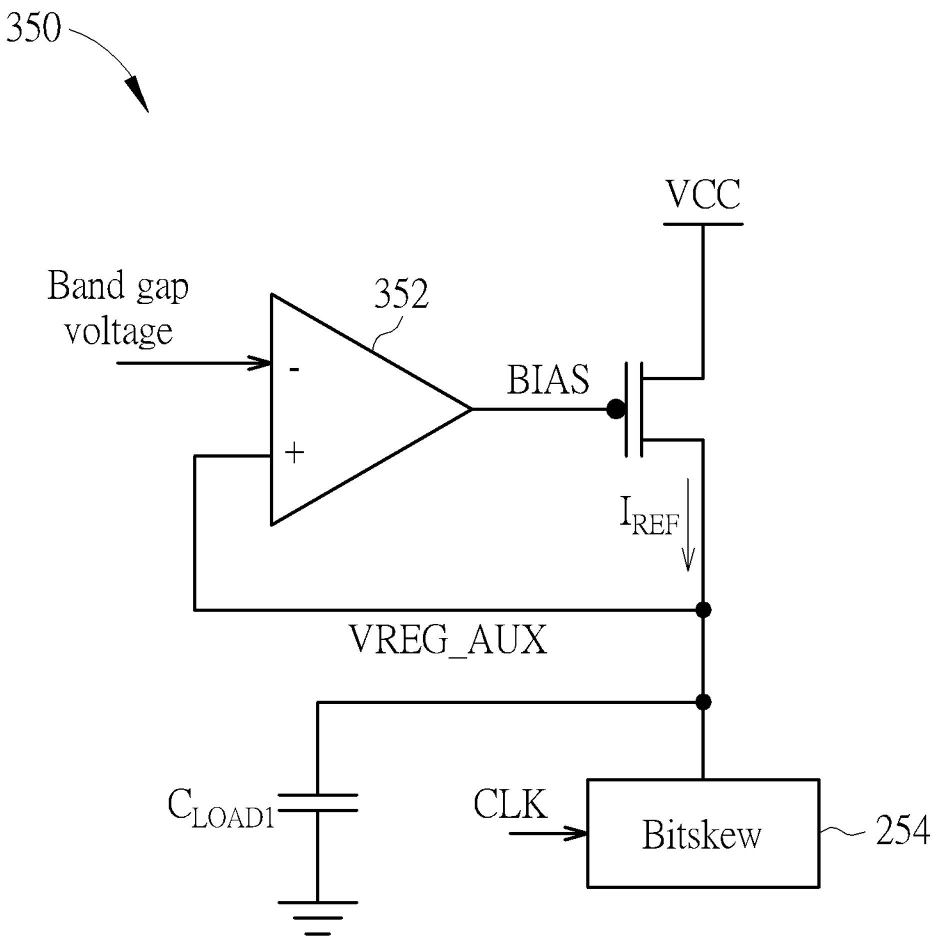
FIG. 3B is a diagram of an auxiliary regulator used in combination with the main regulator illustrated in FIG. 3A.

The above-described voltage regulator and auxiliary regulator use NMOS field effect transistors as the MOSFETs; however, the same objective can also be realized with a circuit that uses PMOS field effect transistors as the MOSFETs. Refer to FIG. 3A and FIG. 3B, which are, respectively, illustrations of a voltage regulator 300 and an auxiliary regulator 350 according to a second embodiment of the present invention. In these diagrams, the MOSFETs are PMOS field effect transistors, so the staggered current sources 330 comprise a plurality of PMOSs coupled in parallel between the voltage supply VCC and the non-inverting input of the amplifier 320, and the inverting and non-inverting inputs of the amplifier 320 of the main regulator 300 and the amplifier 352 of the auxiliary regulator 350 are reversed with respect to FIG. 2A and FIG. 2B. Furthermore, the drain and source terminals of all MOSFETs are reversed with respect to FIG. 2A and FIG. 2B. As one skilled in the art will understand, the circuits illustrated in FIG. 3A and FIG. 3B will operate in the same way as the circuits illustrated in FIG. 2A and FIG. 2B. As the other components of the circuits illustrated in FIG. 3A and FIG. 3B are the same as the components of the circuits illustrated in FIG. 2A and FIG. 2B, the same numerals are used, and a detailed description of the operation of these circuits is not repeated herein.

Figure 4A:
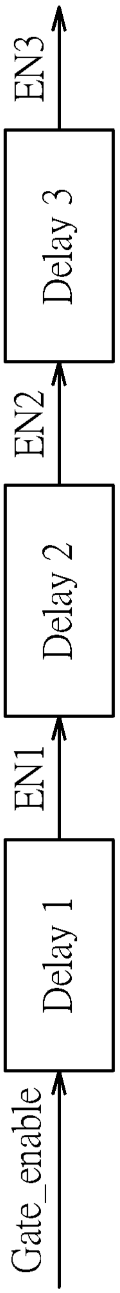
FIG. 4A is a diagram of delay elements used to generate enable signals for the voltage regulator illustrated in FIG. 2A and FIG. 3A.
Figure 4B:
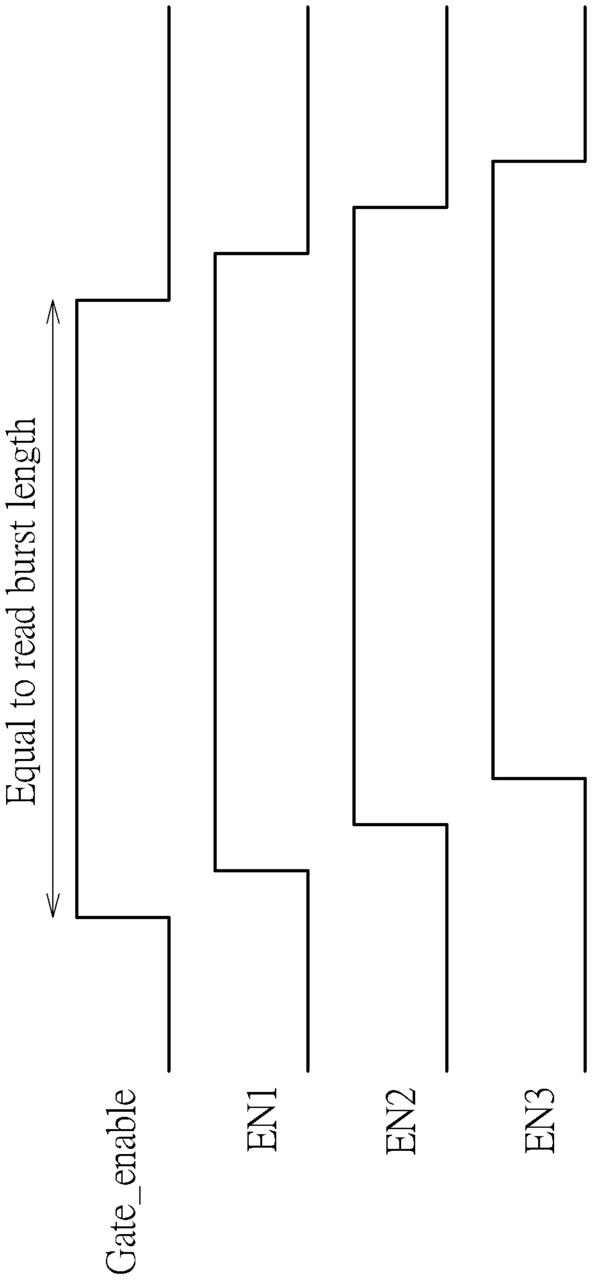
FIG. 4B is a timing diagram of the enable signals illustrated in FIG. 2A and FIG. 3A.

As detailed above, the staggered current sources 230, 330 are designed to follow the timing of delay elements within the DQS path of the DDR PHY 100 receiving the clock signal CLK, and are enabled by respective enable signals EN1, EN2 and EN3. Refer to FIG. 4A, FIG. 4B, FIG. 2A and FIG. 3A. FIG. 4A and FIG. 4B illustrate the generation of these enable signals and how they imitate delays in the read data signal path for a typical DDR system. FIG. 4A illustrates three delay elements coupled in series, wherein the first delay element Delay 1 receives the Gate_enable signal which is also input to the AND gate 105 in the DDR PHY 100. The first delay element Delay 1 delays the signal Gate_enable to generate the first enable signal EN1, which is output to the second delay element Delay 2. The second delay element Delay 2 delays the first enable signal EN1 to generate the second enable signal EN2, which is output to the third delay element Delay 3. The third delay element Delay 3 delays the second enable signal EN2 to generate the third enable signal EN3.

The above delay elements are designed to mimic the delay elements in the DQS path of the DDR PHY 100, wherein Delay 1 mimics the AND gate in the DQS read path, Delay 2 mimics the DCDL in the DQS read path, and Delay 3 mimics the DCC in the DQS read path. In this way, the staggered current sources can be respectively enabled at a same time that the corresponding delay element in the DQS path receives the clock signal CLK, and therefore the regulated voltage VREG supplied to the DDR PHY 100 can match the requirements of the elements therein.

FIG. 4B shows the timing of all four enable signals. The length of time the Gate_enable signal is high is equal to the read burst length of the DDR PHY 100. Due to the sequence of generation of the enable signals, the Gate_enable signal goes low while EN1, EN2 and EN3 are still high, and this causes the enable signals EN1, EN2 and EN3 to go low in sequence.

When the regulated voltage VREG is supplied to the DDR PHY 100, initially VREG is only generated according to the first MOSFET, and the Gate_enable signal is input to the first delay element. The first delay element outputs the first enable signal EN1 by delaying the Gate_enable signal, and the first enable signal EN1 turns on the first switch to generate current I1, such that the current supplied to the DDR PHY 100 is a combination of the output of the first and second MOSFETs. EN1 is then input to the second delay element to generate the second enable signal EN2. EN2 turns on the second switch to generate current I2, such that the current supplied to the DDR PHY 100 is a combination of the output of the first, second and third MOSFETs. EN2 is then input to the third delay element to generate the third enable signal EN3. EN3 turns on the third switch to generate current I3, such that the current supplied to the DDR PHY 100 is a combination of the output of the first, second, third and fourth MOSFETS.

As each of the delay circuits in the DDR PHY 100 has a slightly different current requirement, the staggered current sources I1, I2, I3 are all different values:

$$I1=a*I\text{REF}$$

$$I2=b*I\text{REF}$$

$$I3=c*I\text{REF}$$

In order to determine the values a, b and c, a PVT simulation for the DQS read path can be carried out, and the size of the MOSFETS can be scaled accordingly.

The delay of these enable signals may not exactly match the real delay in the clock propagation path of the DDR PHY 100, but the difference will be negligible. The voltage regulator 200, 300 is on-chip, which further reduces the amount of voltage drop when a read of the DDR PHY 100 occurs.

The circuit of the present invention generates a regulated voltage for a Double Data Rate circuit that can prevent a voltage drop when a read occurs, thereby improving the read margin and the accuracy of the read data.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A voltage regulator, for providing a regulated voltage to a double data rate (DDR) Physical Interface (PHY), the DDR PHY including a clock path and a plurality of data read paths, the clock path comprising a plurality of delay elements for receiving a clock signal and generating a delayed clock signal, respectively, each data read path of the plurality of data read paths comprising a bitskew circuit, the voltage regulator comprising:

an amplifier, for receiving a bandgap voltage at a first input terminal and generating an output voltage;

a first MOSFET having a first terminal coupled to the output voltage, a second terminal coupled to a supply voltage, and a third terminal coupled to a second input terminal of the amplifier;

a second MOSFET for generating a first current in response to a first enable signal, the second MOSFET coupled in parallel with the first MOSFET and having a second terminal coupled to the supply voltage, a first terminal coupled to a bias voltage, and a first switch coupled between the second terminal of the second MOSFET and the supply voltage, wherein the first switch is closed in response to the first enable signal;

a load, coupled to the third terminal of the first MOSFET and a third terminal of the second MOSFET, for generating the regulated voltage;

a load capacitor, coupled in parallel with the load, and coupled to ground;

a third MOSFET for generating a second current in response to a second enable signal, the third MOSFET coupled in parallel with the second MOSFET and having a second terminal coupled to the supply voltage, a first terminal coupled to the bias voltage, and a second switch coupled between the second terminal of the third MOSFET and the supply voltage, wherein the second switch is closed in response to the second enable signal;

a fourth MOSFET for generating a third current in response to a third enable signal, the fourth MOSFET coupled in parallel with the third MOSFET and having a second terminal coupled to the supply voltage, a first terminal coupled to the bias voltage, and a third switch coupled between the second terminal of the fourth MOSFET and the supply voltage, wherein the third switch is closed in response to the third enable signal; and an auxiliary voltage regulator for generating the bias voltage, the auxiliary voltage regulator comprising:

an amplifier, for receiving the bandgap voltage at a first input terminal and a feedback voltage at a second input terminal, and generating the bias voltage;

a fifth MOSFET, having a first terminal coupled to the bias voltage, a second terminal coupled to a power supply, and a third terminal for outputting a reference current, wherein the third terminal is coupled to the second input terminal of the amplifier;

a bitskew circuit, coupled to the third terminal of the fifth MOSFET, the bitskew circuit corresponding to a bitskew circuit of the plurality of bitskew circuits of the DDR PHY, and receiving a clock signal input being the same clock signal that is input to the DDR PHY; and a load capacitor, coupled in parallel with the bitskew circuit, and coupled to ground;

wherein the first enable signal is generated by inputting a gate enable signal into a first delay circuit, the gate enable signal for outputting a delayed clock signal from a first delay element of the plurality of delay elements, a delay of the first delay circuit equaling a delay of the first delay element, the second enable signal is generated by inputting the first enable signal into a second delay circuit, a delay of the second delay circuit equaling a delay of a second delay element of the plurality of delay elements, and the third enable signal is generated by inputting the second enable signal into a third delay circuit, a delay of the third delay circuit equaling a delay of a third delay element of the plurality of delay elements;

wherein the reference current generated by the auxiliary voltage regulator tracks with process, voltage and temperature (PVT) variations in the bitskew circuit, and the reference current tracks with frequency variations in the clock signal.

2. The voltage regulator of claim 1, wherein the first delay element is a logic circuit of the DDR PHY, the second delay element is a digitally controlled delay line circuit of the DDR PHY, and the third delay element is a duty-cycle corrector of the DDR PHY.

3. The voltage regulator of claim 1, wherein the first current, the second current and the third current are all multiples of the reference current.

4. The voltage regulator of claim 3, wherein the size of the first current, the second current and the third current are determined by performing a simulation of the clock read path for the DDR PHY.

5. The voltage regulator of claim 1, being an on-chip voltage regulator.

* * * * *